(No Model.) 2 Sheets—Sheet 1.

A. J. HATCH.
FRUIT DRIER.

No. 335,351. Patented Feb. 2, 1886.

Witnesses,
Geo. H. Strong
J. H. Nourse

Inventor,
A. J. Hatch
By Dewey & Co.
Attorneys (No Model.) 2 Sheets—Sheet 2.

A. J. HATCH.
FRUIT DRIER.

No. 335,351. Patented Feb. 2, 1886.

Witnesses,
Geo. H. Strong.
J. H. Nourse.

Inventor,
A. J. Hatch
By Dewey & Co
Attorneys

UNITED STATES PATENT OFFICE.

ANDREW J. HATCH, OF SAN FRANCISCO, CALIFORNIA.

FRUIT-DRIER.

SPECIFICATION forming part of Letters Patent No. 335,351, dated February 2, 1886.

Application filed September 14, 1885. Serial No. 177,123. (No model.)

*To all whom it may concern:*

Be it known that I, ANDREW J. HATCH, of the city and county of San Francisco, State of California, have invented an Improvement in Fruit-Driers; and I hereby declare the following to be a full, clear, and exact description of the same.

My invention relates to that class of fruit-driers in which a horizontal longitudinal drying-chamber is employed, and in which the trays containing the fruit are inserted upon rolling trucks or cars, hot air being supplied to the drying-chamber from a suitable heating-chamber beneath it, and caused to pass through by means of a suction fan-wheel.

My invention consists in certain new and useful improvements, which may be briefly enumerated as follows: means for providing a reversible draft of hot air horizontally through the drying-chamber—that is to say, changing the direction of said draft from one end of the drying-chamber to the other, as may be desired; a peculiar distributer placed within the drying-chamber above the hot-air apertures communicating with the heating-chamber; a device used in connection with the suction-fan for preventing the rotary motion of the air, and a means for inserting the car or truck with its trays without unduly exposing the drying-chamber to the influence of the outside air.

My invention further consists in certain minor details of construction, which I shall hereinafter fully explain.

The object of these improvements will appear in the course of the following description.

Figure 1:
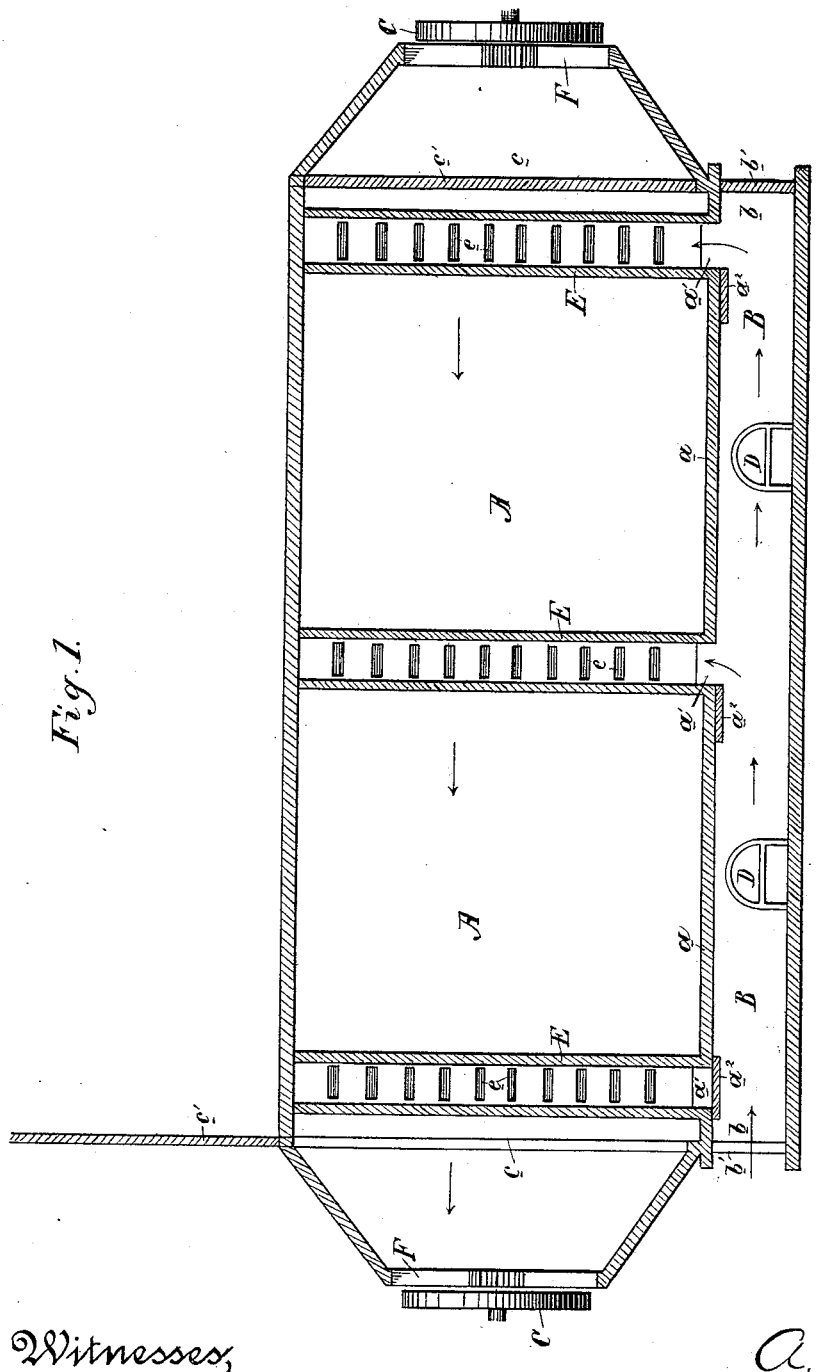
Figure 3:
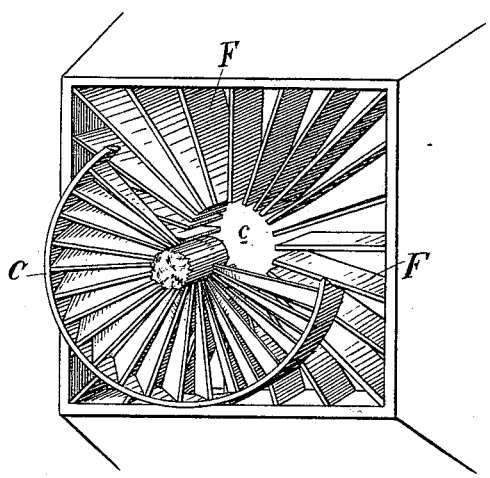
Figure 2:
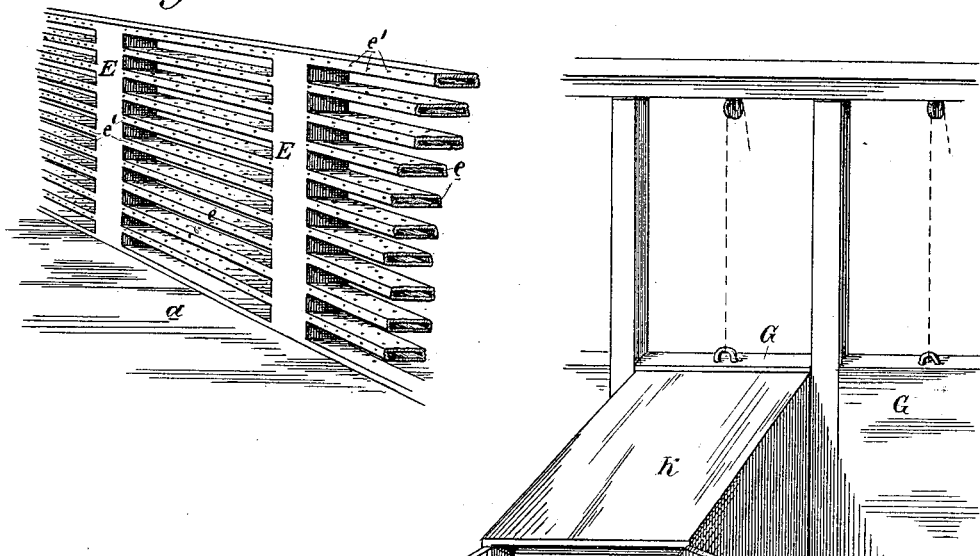
Figure 4:
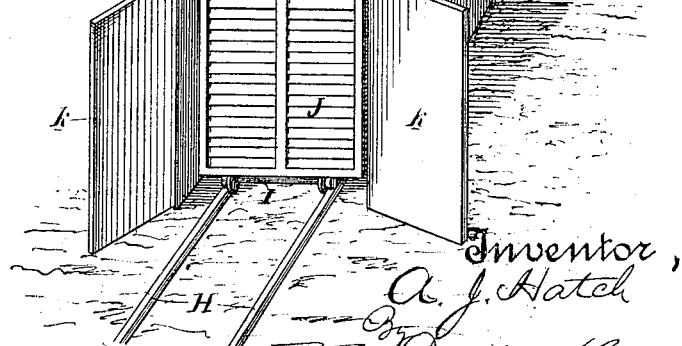

Referring to the accompanying drawings, Figure 1 is a vertical longitudinal section of the drying and heating chamber, illustrating particularly the means of removing the air-draft. Fig. 2 is a perspective detail of the hot-air distributer. Fig. 3 is a detail of the barrier F, placed in front of the suction fan-wheels. Fig. 4 is a view of the anteroom or casing K, for introducing the tray-laden trucks to the drying-chamber.

A is the horizontal drying-chamber, having a floor or bottom, $a$, beneath which is the heating-chamber B, extending the whole length of the furnace.

C are suction fan-wheels, one being at each end of the drying-chamber.

In driers where an artificial horizontal forced draft is employed the greatest difficulty in securing desired results arises from the fact that the fruit or material to be dried nearest the heating apparatus or nearest the influx of hot air as it enters the chamber is constantly subjected to a greater degree of heat than is desirable, while the fruit or material in the farther end of the chamber or farther away from the incoming hot-air current does not receive air sufficiently heated or sufficiently divested of moisture to expedite the process of drying. In order to obviate this difficulty, and to equalize and expedite the process of evaporation, I construct the drying-chamber over the heating-chamber, which extends from one end, or nearly so, to the other end of the drying-chamber, and of such dimensions as will admit of placing heaters or furnaces therein, (here represented by D.) The heating-chamber is connected with the drying-chamber above by means of apertures $a'$ in the floor of the drying-chamber, controlled by gates, slides, or dampers $a^2$, said apertures being at both ends and at such intervals between as may be necessary for the admission of the hot-air current from the heating-chamber into the drying-chamber. At each end of the heating-chamber I provide an opening, $b$, controlled by gates or slides $b'$, for the admission of cold air, which becomes heated in passing through the heating-chamber, and is caused to flow through the openings $a'$ in the floor by means of the apparatus used, preferably one or more fan-wheels, C, for creating a current of air through the drying-chamber. At each end of the drying-chamber I have openings $c$ for the exit of the air to be exhausted or expelled. These openings are provided with suitable doors or gates, $c'$, which may be readily opened or closed, as occasion requires. When the cold-air aperture into the heating-chamber is open and the exit air-opening in the opposite end of the drying-chamber is closed, the cold air in its passage through the heating-chamber becomes heated, and is caused to flow through the apertures $a'$ in the floor of the drying-chamber and pass through said chamber, and is discharged through the opening in its end, which is at the same end as that at which the cold air entered the heating-chamber. When the air has flowed through the heating and drying chambers, as above described, for a given time, subjecting the fruit at one end of the drying-chamber to the greatest heat for a sufficient length of time, I reverse the direction of the air-current by closing the gates in both chambers, which were heretofore open, and opening the gates at the other ends of the chambers, which were heretofore closed, whereby the air-current takes an opposite direction, and dries the fruit more effectually at the other end of the drying-chamber. The reversal of the current of air by these means can be repeated as often as may be found practicable.

The perfect distribution of hot air as it enters the drying-chamber, up to the present time, has not been satisfactorily obtained. To effect the best result in this respect, I place within the drying-chamber transversely, and over the air-passages $a'$, communicating with the hot-air chamber below, an apparatus which I term a "hot-air distributer." It consists of upright tubes or hollow columns E, connected by horizontal tubes or hollow shelves $e$, the shelves being preferable, as they conform better to the position of the trays, and the open air passages or spaces between the trays, and which position should be preserved throughout the length of the drying-chamber. The shelves or tubes are provided with slots or holes $e'$, through which the air is emitted freely but in small quantities into the drying-chamber. The hot air rising in columns passes, partly by its own volition and partly by the force or suction caused by the exhaust apparatus, into the hollow horizontal tubes or shelves, and is distributed freely and evenly through their openings into the drying-chamber.

The exhaust fan-wheel C, used in expelling the air from the drying-chamber, is usually made of sheet-iron blades or wings extending from the center to the perimeter of the wheel. This wheel has one objection, however, when applied to this drier. The current of air incoming in contact with the wheel has a rotary motion imparted to it, and is carried around by the wheel, instead of being cut off by the blades and thrown out on the opposite side. To prevent this, I provide any practical barrier to the local rotary current. Preferably I place as close as possible to and across the inner face or receiving side of the wheel a number of slats, bars, or shelves, F, set with their edges toward the wheel in such a manner as to arrest the rotary motion of the air. I prefer to have these bars or shelves radial and extend parallel with the blades of the wheel. Each blade as it passes the bar or shelf cuts off the air and throws it out, instead of carrying it around with it. By means of this device any ordinary exhaust fan-wheel can be made effective and useful in exhausting and expelling the air from the drier.

In all large driers where cars are used to facilitate the process of charging and discharging the drying-chamber a great inconvenience and loss of heat is experienced, and the process of evaporation is retarded by the inward rush of cold air when the doors of the chambers are raised to admit or withdraw the car. To prevent this, I have the following: G are the doors of the drier, here shown as being adapted to rise, though they may be otherwise arranged. H is one of the tracks upon which the car I travels to carry the trays J into the chamber. K is a casing, approximately air-tight, and forming, as it were, an anteroom or chamber. This is placed in front of a door, and is of the required size to admit one or more cars. It may be stationary or movable; but I prefer to have it movable, so that it may be placed before any door or section of the drying-chamber and be readily moved from one door or section to the other, or set aside when desired. The casing K is provided at its outer end with a door, $k$, either swinging or sliding, through which the car is admitted. The door is closed after the car is pushed in, and the door G of the drying-chamber is then opened, when the car is pushed into place in the drying-chamber. The door of the chamber is then closed, and the door of the casing may be opened.

In removing the car from the drying-chamber, I close the door of the casing K and open the door of the chamber. The car is then pushed into place in the casing, when the door of the drying-chamber is closed. Then the door of the casing is opened and the car is removed.

Although I have shown the apertures $a$ connecting the drying-chamber with the heating-chamber in the floor of the former chamber, it is not essential that they should be so located as they could be in the ends of said drying-chamber at or near the bottom, and communicating with the heating-chamber by means of small end passages.

Though I have described two suction fan-wheels, one at each end, I do not wish to thus confine myself, as I may use any form of exhausting apparatus for the reversible draft, and this apparatus or the suction fan-wheels, one or more in number, may be located in any position, provided it or they are adapted to exhaust from both ends of the drying-chamber.

Having thus described my invention, what I claim as new, and desire to secure by Letters Patent, is—

1. In a fruit-drier having a drying-chamber, in which the fruit is contained, and a heating-chamber below, apertures connecting said chambers, apertures in each end of the heating-chamber, controlled by gates or slides, apertures in the ends of the drying-chamber, controlled by gates or slides, and a means for creating a draft through said chamber, substantially as herein described.

2. In a fruit-drier, the combination of the drying-chamber A, having apertures $c$ in each end, controlled by gates $c'$, the heating-chamber B below, having apertures $b$ at each end, controlled by slides or gates $b'$, the apertures $a'$, having gates $a^2$ between the two chambers, and an exhaust for each end of the drying-chamber, substantially as herein described.

3. In a fruit-drier, the drying-chamber A and the underlying heating-chamber B, communicating with the drying-chamber by means of apertures $a'$, in combination with stationary tubes or hollow columns placed over said apertures and arranged in line transversely of the drying-chamber, and tubes or hollow shelves, upon which the trays are placed, provided with apertures or openings, and connecting the tubes or hollow columns, substantially as herein described.

4. In a fruit-drier, the drying-chamber A and an underlying heating-chamber extending its entire length, and communicating with the drying-chamber through apertures $a'$, in combination with an air-distributer consisting of a series of upright tubes or hollow columns over the apertures, and hollow perforated shelves, upon which the trays are placed, and connecting the tubes or hollow columns, substantially as herein described.

In witness whereof I have hereunto set my hand.

ANDREW J. HATCH.

Witnesses:
S. H. NOURSE,
H. C. LEE.